(12) United States Patent
Tong et al.

(10) Patent No.: US 6,949,234 B2
(45) Date of Patent: Sep. 27, 2005

(54) WET ABATEMENT SYSTEM FOR WASTE SIH$_4$

(75) Inventors: Lee Kok Tong, Singapore (SG); Chong Peng Chee, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 255 days.

(21) Appl. No.: 09/957,424

(22) Filed: Sep. 21, 2001

(65) Prior Publication Data

US 2003/0057576 A1    Mar. 27, 2003

(51) Int. Cl.$^7$ .......................... B01D 47/00; C01B 33/00
(52) U.S. Cl. ...................................... 423/210; 423/339
(58) Field of Search ................................ 423/248, 210, 423/339

(56) References Cited

U.S. PATENT DOCUMENTS

| | | | |
|---|---|---|---|
| 4,801,437 A * | 1/1989 | Konagaya et al. | 423/210 |
| 5,123,836 A * | 6/1992 | Yoneda et al. | 431/5 |
| 5,183,646 A | 2/1993 | Anderson et al. | 423/210 |
| 5,320,817 A | 6/1994 | Hardwick et al. | 423/237 |
| 5,955,037 A * | 9/1999 | Holst et al. | 422/171 |
| 6,126,906 A | 10/2000 | Imamura | 422/170 |
| 6,174,349 B1 * | 1/2001 | DeSantis | 95/205 |
| 2002/0040641 A1 * | 4/2002 | Wu et al. | |

OTHER PUBLICATIONS

Wu et al. U.S. Appl. No. 09/886,010 filed Jun. 22, 2001.*

* cited by examiner

*Primary Examiner*—Steven Bos
(74) *Attorney, Agent, or Firm*—George O. Saile; Rosemary L. S. Pike; Stephen B. Ackerman

(57) ABSTRACT

A new method of silane abatement is achieved. The novel silane abatement system comprises a water-filled chamber within an outer chamber. An air intake is located in one upper portion of said outer chamber and an exhaust output is located in another upper portion of the outer chamber. A silane gas intake pipe runs into the outer chamber and has its output under water in the water-filled chamber. A drain is connected through a valve at a bottom portion of the water-filled chamber. Many safety features are built into the wet abatement system, including temperature and water level sensors, water sprinklers, and means for shutting off air supply, exhaust, and silane intake. Waste silane gas is bubbled into a water-filled chamber. The waste silane gas is reacted with oxygen in water in the water-filled chamber whereby $SiO_2$ precipitates are formed and wherein the $SiO_2$ precipitates settle to a bottom surface of the water-filled chamber. The $SiO_2$ precipitates are drained out of the water-filled chamber to complete the abatement process.

6 Claims, 2 Drawing Sheets

WET ABATEMENT SYSTEM FOR WASTE SIH₄

BACKGROUND OF THE INVENTION (1) Field of the Invention

The invention relates to a method of and device for abatement of waste $SiH_4$ in the fabrication of integrated circuits, and more particularly, to a method of and device for safe wet abatement of waste $SiH_4$ in the manufacture of integrated circuits.

(2) Description of the Prior Art

Chemical vapor deposition (CVD) processes are widely used in integrated circuit manufacturing. For example, polysilicon or silicon dioxide layers can be deposited by CVD using silane ($SiH_4$) gas or other similar gases. After the CVD process has been completed, excess silane gas remains in the CVD system. Typically, excess reactant gases are removed by an exhaust system. The exhaust system may vent the reactant gas to the atmosphere. However, silane gas is pyrophoric and cannot be released into the atmosphere. Silanes and similar gases must be filtered from the exhaust gas stream or converted to compounds that can be disposed of safely. A common method of converting waste silane to a disposable compound is through combustion in a so-called "burn box". In the burn box, the $SiH_4$ is converted to $SiO_2$ by the reaction: $2SiH_4 + 2O_2 \rightarrow 2SiO_2 + 4H_2$. However, the risk is that the burn box may be a source of fire if system failure occurs suddenly. For example, if the exhaust system fails, residue $SiH_4$ will collect in the burn box making it likely that an uncontrolled fire will start.

U.S. Pat. No. 6,174,349 to DeSantis, U.S. Pat. No. 6,126,906 to Imamura, and U.S. Pat. No. 5,183,646 to Anderson et al describe processes and devices including burn boxes. Wet scrubbers and other abatement methods are also used. U.S. Pat. No. 6,174,349 to DeSantis teaches a wet scrubber in combination with the burn box. U.S. Pat. No. 5,955,037 to Holst et al shows an oxidation treatment. U.S. Pat. No. 5,320,817 to Hardwick et al uses an amine-forming metal salt to scrub silane.

SUMMARY OF THE INVENTION

Accordingly, a principal object of the present invention is to provide an effective and very manufacturable method of silane abatement in the fabrication of integrated circuit devices.

Another object of the present invention is to provide an effective and very manufacturable method of silane abatement wherein the abatement system does not present the danger of being a source of fire.

Another object of the invention is to provide a silane abatement system that does not present the danger of being the source of fire.

In accordance with the objects of this invention a new method of silane abatement is achieved. Waste silane gas is bubbled into a water-filled chamber. The waste silane gas is reacted with oxygen in water in the water-filled chamber whereby $SiO_2$ precipitates are formed and wherein the $SiO_2$ precipitates settle to a bottom surface of the water-filled chamber. The $SiO_2$ precipitates are drained out of the water-filled chamber to complete the abatement process.

Also in accordance with the objects of this invention a new silane abatement system is achieved. The silane abatement system comprises a water-filled chamber within an outer chamber. An air intake is located in one upper portion of the outer chamber and an exhaust output is located in another upper portion of the outer chamber. A silane gas intake pipe runs into the outer chamber and has its output under water in the water-filled chamber. A drain is connected through a valve at a bottom portion of the water-filled chamber. Many safety features are built into the wet abatement system, including temperature and water level sensors, water sprinklers, and means for shutting off air supply, exhaust, and silane intake.

BRIEF DESCRIPTION OF THE DRAWINGS

In the accompanying drawings forming a material part of this description, there is shown.

DESCRIPTION OF THE PREFERRED EMBODIMENTS

The present invention provides a method and a device for waste silane abatement. The waste silane abatement system of the present invention successfully deals with the waste silane without danger of being a fire source. No burn box is used in the method and device of the invention. Rather, waste $SiH_4$ gas is reacted with dissolved oxygen to form solid $SiO_2$ which can be disposed of safely. Safety features of the device of the present invention include sprinklers that will be automatically triggered in the event of fire.

Figure 1:
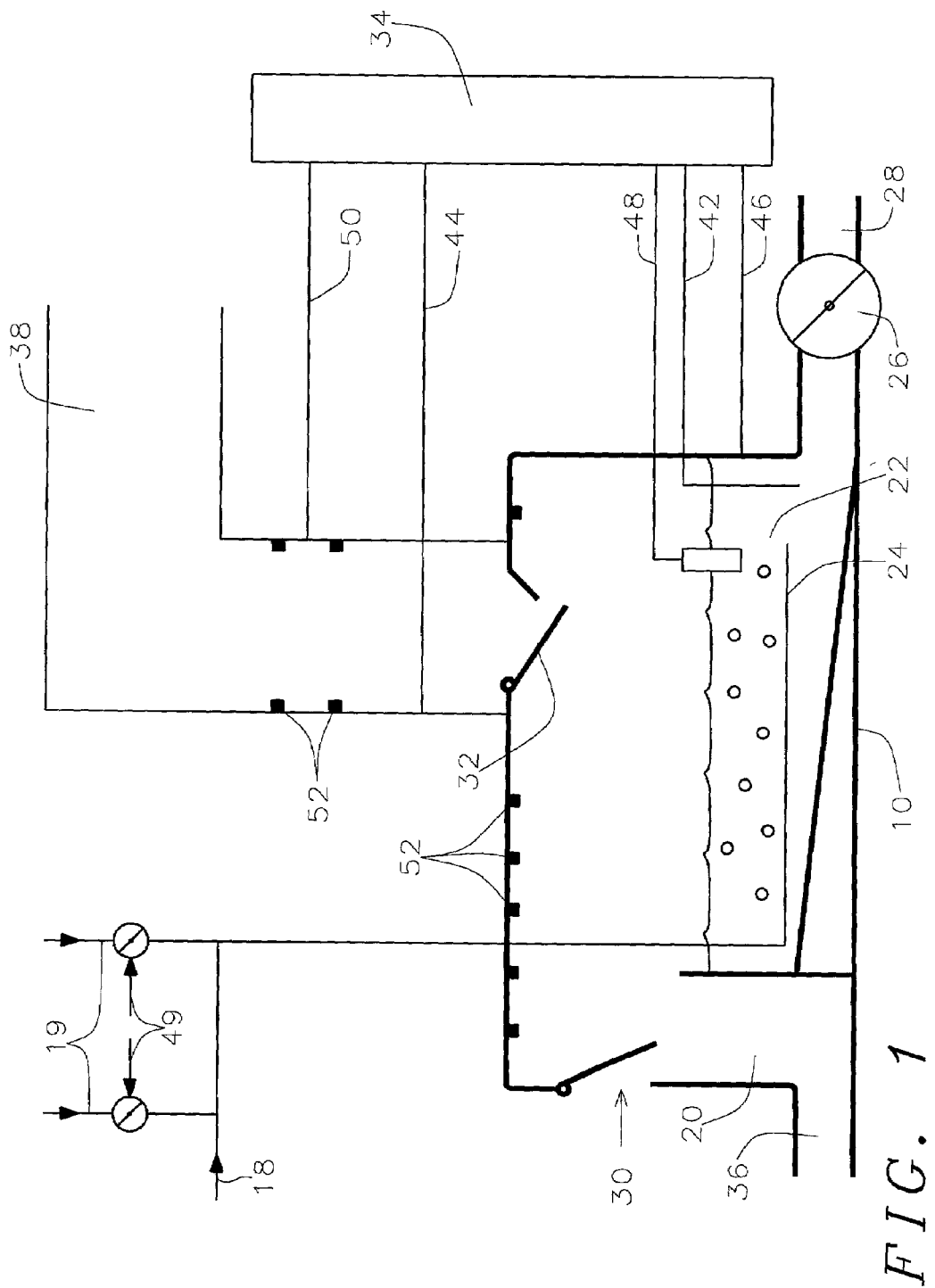
FIGS. 1 and 2 schematically illustrate in cross-sectional representation a preferred embodiment of the present invention.
Figure 2:
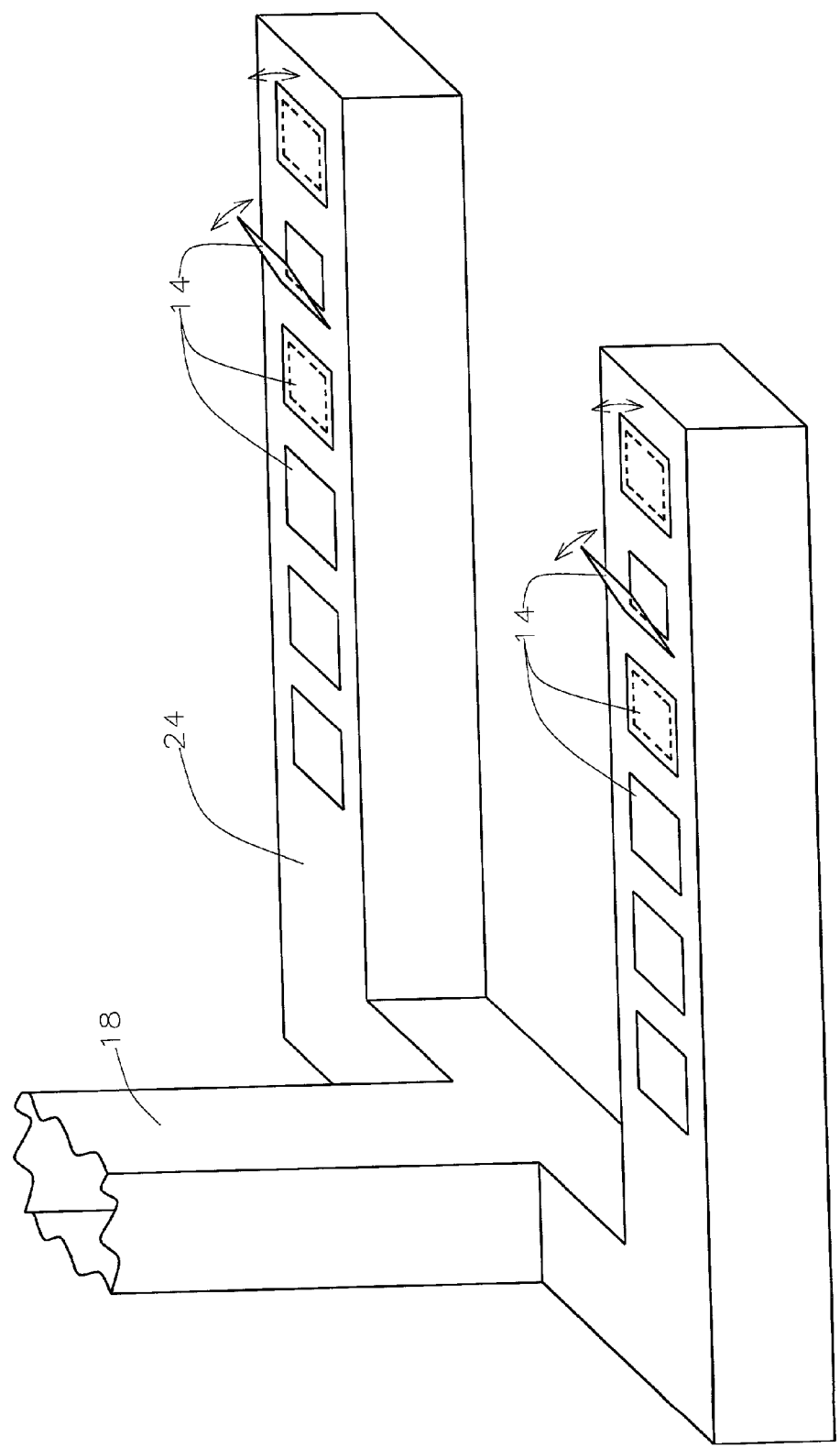

FIGS. 1 and 2 illustrate the waste $SiH_4$ abatement system of the present invention. Referring now to FIG. 1, waste abatement device 10 is shown. A portion of the device is filled with water 22. Oxygen gas is dissolved in the water 22. Waste $SiH_4$ gas enters the chamber 10 from through a pressurized pipe 18. High pressure $N_2$ gas flow 19 pushes the $SiH_4$ gas through the pipe 18, into the chamber 10 and out through the pipe 24 under the water. $N_2$ gas here is used to prevent back fire to the process tool. If backfire occurs, $N_2$ is activated to push the fire into the water chamber. The $N_2$ gas flow is at a high pressure of about 100 psi.

The $SiH_4$ gas is bubbled into the water 22. FIG. 2 is a close-up of the pipe 24. The waste $SiH_4$ gas is pumped through pipe 18 into a C-shaped stainless steel square pipe 24. Flippers 14 are pushed upward by pressure to release $SiH_4$ gas for reaction with dissolved $O_2$ for abatement. In water at 25° C., there is about 8.4 ppm of dissolved $O_2$. The gas reacts with dissolved oxygen in the water to form a heavy precipitate of $SiO_2$. The $SiO_2$ precipitate sinks slowly to the base of the chamber. The drain valve 26 is opened, subject to the $SiO_2$ level, to clear the solid $SiO_2$ out through the drain 28. Most likely, the drain valve may be opened once a day.

Chamber 20 provides for water overflow. Continuous fresh air intake 30 into the chamber 10 insures the process of oxygen dissolving into the water from the air is not interrupted. An open-ended drain 36 in the chamber 20 will capture water over-flow from the water-filled section 22 of the chamber. An exhaust pipe 38 is separated from the chamber 10 by an exhaust flipper 32. The exothermic abatement process may release smoke into the chamber. This smoke is exhausted into the pipe 38. The exhaust pipe also provides forced air ventilation from the chamber outside into chamber 10 for the air dissolving process.

A controller 34 controls the water supply 42 and fusible link 44. The controller also monitors a water temperature sensor 46, a water level sensor 48, and an exhaust temperature sensor 50. Water sprinklers 52 located in the chamber ceiling and in the exhaust pipe are triggered by the controller by a high water temperature, high exhaust pipe temperature, or when the fusible link is broken. The fusible link is a burnable material such as nylon. If this link is exposed to heat high enough to break it, the controller will turn on the water sprinklers. The water level sensor avoids "dry-run" operations if the water level is not high enough.

If a minor explosion occurs within the chamber 10, the air intake 30 and the exhaust flipper 32 will shut. The flippers are normally open, but will be pushed closed by the pressure of an explosion. The oxygen source will also be cut off to stop any fire. That is, the air intake flipper 30, normally open, will be pushed closed by pressure due to fire. If the fusible link 49 within one or both of the $N_2$ high pressure pipes is broken, indicating high heat, high pressure $N_2$ flow 19 will be triggered to push the fire back into the water chamber 22 and to form $N_2$ blanketing to stop a fire.

The wet abatement system of the present invention consists of a water-filled chamber within an outer chamber. An air intake flipper and an exhaust flipper control input and output of air. A drain is connected through a valve to the water-filled chamber. An overflow drain is at the bottom of the outer chamber. A controller controls the water supply and monitors the water level, water temperature, exhaust temperature, and a fusible link within the exhaust pipe. A pipe brings waste $SiH_4$ gas into the water-filled chamber. A high pressure pump pushes the waste gas through the pipe.

In the wet abatement process of the present invention, waste silane gas is bubbled into the water-filled chamber of the wet abatement system of the present invention. $N_2$ gas at high pressure pushes the silane gas through a pipe into the water-filled chamber. The silane gas reacts with oxygen dissolved in the water to form a precipitate of $SiO_2$. The $SiO_2$ settles to the bottom of the chamber and is removed from the chamber through a drain.

The process of the present invention abates waste $SiH_4$ in the water state. The abatement system will not be a source of fire because of the safety features of the wet abatement system of the present invention. These safety features include: water sprinklers located on the ceiling of the outer chamber above the water-filled chamber and in the exhaust pipe, air intake and exhaust flippers that close in the event of an explosion, a process pump trip, fusible links located within the exhaust pipe and within the $N_2$ pipes that will break if exposed to high heat, water temperature and exhaust temperature sensors, and a water level sensor. The controller monitors the sensors and the fusible links. If either of the temperature sensors show a high temperature or if any of the fusible links are broken, the water sprinklers are triggered, the air intake and exhaust flippers are closed, the oxygen supply into the chamber is cut off, and the $N_2$ gas pump is shut down after pushing residue waste gas into the water-filled chamber. If the water level sensor shows the water level is too low, the system is also shut down.

The process and device of the present invention provide wet silane abatement without danger of fire from the abatement system. The wet abatement system of the present invention has a variety of safety features that work together to provide safe and effective silane abatement.

While the invention has been particularly shown and described with reference to the preferred embodiments thereof, it will be understood by those skilled in the art that various changes in form and details may be made without departing from the spirit and scope of the invention.

What is claimed is:

1. A silane abatement process comprising:
   flowing $N_2$ gas at high pressure to push waste silane gas into a water-filled chamber and bubble said waste silane gas into said water-filled chamber;
   reacting said waste silane gas with oxygen dissolved in water in said water-filled chamber whereby $SiO_2$ precipitates are formed and wherein said $SiO_2$ precipitates settle to a bottom surface of said water-filled chamber; and
   draining said $SiO_2$ precipitates out of said water-filled chamber.

2. The process according to claim 1 wherein said high pressure is about 100 psi.

3. A silane abatement process consisting of:
   flowing $N_2$ gas at high pressure to push waste silane gas into a water-filled chamber wherein said waste silane gas enters said chamber under the water;
   reacting said waste silane gas with oxygen dissolved in said water in said water-filled chamber whereby $SiO_2$ precipitates are formed and wherein said $SiO_2$ precipitates settle to a bottom surface of said water-filled chamber; and
   draining said $SiO_2$ precipitates out of said water-filled chamber.

4. The process according to claim 3 wherein said high pressure is about 100 psi.

5. A silane abatement process consisting of:
   providing waste silane gas from a manufacturing process;
   without first applying a combustion process, flowing $N_2$ gas at high pressure to push waste silane gas into a water-filled chamber wherein said waste silane gas enters said chamber under the water;
   supplying a continuous fresh air intake into said water-filled chamber;
   reacting said waste silane gas with oxygen dissolved in said water in said water-filled chamber whereby $SiO_2$ precipitates are formed and wherein said $SiO_2$ precipitates settle to a bottom surface of said water-filled chamber; and
   draining said $SiO_2$ precipitates out of said water-filled chamber.

6. The process according to claim 5 wherein said high pressure is about 100 psi.

* * * * *